Patented Nov. 5, 1946

2,410,595

UNITED STATES PATENT OFFICE 2,410,595

RUBBERLIKE PRODUCTS

Raymond F. Bacon, Bronxville, and Rocco Fanelli, New Rochelle, N. Y., assignors to Texas Gulf Sulphur Company, New York, N. Y., a corporation of Texas No Drawing. Application May 18, 1943, Serial No. 487,496

10 Claims. (Cl. 260—79)

This invention relates to the production of products resembling rubber, and has for its objects the provision of an improved rubber-like product or elastomer, and a method of making the same.

The invention is based on our discovery that a mixture of liquified 1,3 butadiene and sulphur when heated in a closed vessel forms rubber-like products of varying degrees of resilience and plasticity or hardness depending upon such factors as the relative proportions of the two components, the temperature and time of treatment etc. In its broad aspect, the method of the invention comprises heating a mixture of 1,3 butadiene and sulphur in a closed vessel to a temperature of from about 70° C. to about 160° C., or even higher, for at least one hour (generally for several hours and sometimes for many hours), the relative proportions by weight of butadiene (in liquid form) and sulphur in the mixture being from 1 part of butadiene and 1 part of sulphur to 1 part of butadiene and 9 parts of sulphur. The amount of water included in the reaction mixture may vary from 0.5 to 4 parts. The reaction product is a novel and useful rubber-like material that can replace rubber, in whole or in part, in many present-day uses of natural and/or synthetic rubber. The physical properties of the reaction product are susceptible of wide control by varying the relative proportions of butadiene and sulphur in the reaction mixture, by the inclusion in the mixture of various catalytic and/or synergistic agents, solvents of butadiene and/or sulphur, and the like, and by varying the temperature and/or the time of the reaction in the closed vessel. Throughout this specification and the appended claims, we will henceforth refer to 1, 3 butadiene ($CH_2{:}CH{\cdot}CH{:}CH_2$) simply as butadiene.

In carrying out the invention in one of its simple aspects, a predetermined amount (e. g. 50-90% by weight of the total weight of the reaction mixture) of finely divided sulphur is charged into an autoclave, or other suitable closed reaction vessel, and a predetermined amount (e. g. 50-10% by weight of the total weight of the reaction mixture) of liquified butadiene is then pumped into the autoclave. Butadiene is a gas at normal atmospheric pressure and temperature. It is readily liquified, and in liquid form its boiling point is around minus 5° C. at atmospheric pressure. The closed or sealed autoclave is heated to the predetermined temperature, the reaction mixture is agitated or stirred, and the reaction is permitted to proceed for the predetermined time interval. The higher the temperature, the more rapidly the reaction proceeds. For example, at temperatures of 150–160° C., rubber-like products are produced in about 1 to 2 hours, at temperatures of 125–135° C. similar rubber-like products are produced in from 14 to 20 hours, while at temperatures of 70–90° C., the time interval for substantially the same reaction will be about 100 hours. The rubber-like products are initially produced in a relatively soft and resilient physical state resembling natural smoked crepe or sheet rubber, which may be progressively varied up to a hard state, resembling ebonite, by increasing the time interval of the reaction, other conditions remaining the same. The reaction may be terminated when the initially soft and resilient rubber-like product has been formed, or may be continued until a hard ebonite-like product is formed, or may be terminated at any intermediate stage for producing rubber-like products of any desired degree of resilience or hardness. Thus, by appropriate control of the relative proportions of butadiene and sulphur, of temperature and of time of treatment, products of varying degrees of resilience and plasticity or hardness, from those resembling soft crude rubber to those resembling hard vulcanized rubber, can be obtained.

At the commencement of the reaction, a certain pressure exists within the reaction vessel due to volatilization of the butadiene, but as the reaction proceeds the butadiene polymerizes and also combines with or takes on sulphur and the pressure drops, and at the end of the reaction any pressure existing within the vessel is occasioned by such uncombined water vapor or volatile solvent as may have been included in the reaction mixture. Upon termination of the reaction, the reaction vessel may be opened, and the reaction product removed. Where the reaction has been carried out at relatively high temperatures, it is advisable to permit the reaction vessel to cool down until such pressure as may exist therein has subsided to approximately atmospheric pressure.

The relatively soft and resilient reaction product is non-sticky, and is easily removed from the reaction vessel and separated from any uncombined liquid, such as water, solvent, etc. If desired, the product may be washed, milled and sheeted. In physical appearance, this relatively soft and resilient product generally resembles natural crepe or sheet rubber, and it can be subjected to subsequent processing, compounding and the like in much the same manner as natural or synthetic rubber. It can be extended or stretched 200% and still will return to its original state. By continuing the reaction at the predetermined reaction temperature beyond the time at which the relatively soft and resilient product is obtained, the rubber-like product becomes progressively harder and less resilient until finally a hard product resembling ebonite is obtained.

The reaction of the butadiene and sulphur can be promoted and modified in many ways by the inclusion of various agents in the reaction mixture. Thus, water may advantageously be included in the mixture of butadiene and sulphur. The water promotes the reaction, and prevents sticking of the reaction product to the walls of the autoclave or other closed vessel, and hence facilitates removal of the product from the vessel. The amount of water included in the reaction mixture may advantageously be 10–40% by weight on the total weight of the mixture, in which case the mixture may include 50% to 90% sulphur with the balance 1, 3 butadiene. Solvents, like alcohol, toluene and carbon bisulphide, also prevent sticking of the reaction product to the walls of the vessel, and in some instances appear to otherwise contribute beneficially to the reaction. Water-soluble bases, such as sodium hydroxide, which react with sulphur to form water-soluble sulphides (e. g. sodium sulphide) may be added to the reaction mixture, and serve to speed up the reaction. Similarly, water-soluble sulphides, and particularly alkali-metal sulphides, may be included in the reaction mixture to speed up the reaction, and to prevent the formation of compact masses of unreacted sulphur especially at temperatures below the melting point of sulphur. Such water-soluble sulphides appear to act as catalysts, and such agents may be included in the mixture in amount up to about 10% by weight. Copolymers such as styrene, isoprene and the like may be included in the reaction mixture, and serve to improve the properties of the reaction product for certain uses. Such agents as styrene and isoprene may advantageously replace up to 20% of the butadiene otherwise employed, and may even be present in amount up to 100% by weight on the weight of butadiene in the mixture.

A very satisfactory product of the invention is produced with a mixture of 1 part of liquified butadiene and 4 parts of sulphur (each by weight; the specific gravity of liquified butadiene is about 0.65). About 0.5 to 1 part by weight of water is included in the mixture. In place of water, about 0.5 to 1 part by weight of an aqueous solution of potassium sulphide (of a concentration up to saturation, i. e. about 40 grams $K_2S$ per 100 cc.) may be included in the mixture. Upon heating the mixture in a sealed autoclave at a temperature of 125–135° C. for from 15 to 20 hours, a relatively soft and resilient rubber-like product is produced. Continued heating of this reaction product in the autoclave at the same temperature for another 20 hours or so produces a product resembling hard vulcanized rubber. The relatively soft and resilient rubber-like product may be substituted for natural or synthetic rubber, in whole or in part, in a wide field of technical applications. It can be processed with softening agents, plasticizers, pigments and the like, and it can be compounded with the customary rubber compounding agents. Thus, for example, satisfactory rubber sheeting may be made by milling one part of this rubber-like product of the invention with one part of natural rubber or synthetic rubber (e. g. Hycar). Various other uses may be made of these relatively soft and resilient rubber-like products of the invention for extending natural or synthetic rubbers. The hard product of the invention is thermoplastic, and can be molded, machined, polished, etc.

The following additional examples illustrate reaction mixtures which have been successfully used in practice in making relatively soft and resilient rubber-like products of the invention. The parts are by weight in all the examples. The reaction mixture was constantly agitated. By continuing the reaction for a period of time of from ¼ to ½ longer, the hard ebonite-like products of the invention are formed:

A. 1.3 parts liquid butadiene
   0.5 to 4 parts water
   4.0 parts sulphur
   100 hours at 85–95° C.

B. 1.0 to 1.3 parts liquid butadiene
   1.2 parts potassium sulphide solution (20 grams $K_2S$ per 100 cc.)
   4.0 parts sulphur
   80 hours at 85–95° C.

C. 0.65 part liquid butadiene
   0.18 part styrene
   1.0 part water
   4.0 parts sulphur
   12 hours at 115–120° C.

D. 1.0 part liquid butadiene
   1.2 parts potassium sulphide solution (20 grams $K_2S$ per 100 cc.)
   4.0 parts sulphur
   48 hours at 100° C.

The final relatively soft and resilient rubber-like products of the foregoing examples have much the same physical appearance. In general, the products have greater elasticity as the ratio of butadiene to sulphur increases. Also, increasing the ratio of butadiene to sulphur increases the necessary time of reaction. With higher reaction temperatures, the time differential becomes shorter. While a small amount of the water or solution may be incorporated in the final product, the bulk of the water or solution remains as such at the conclusion of the operation.

As previously mentioned, the reaction between the butadiene and sulphur proceeds more rapidly at higher temperatures. It is even practical, and sometimes advantageous, to employ temperatures above the temperature (around 160° C.) at which sulphur begins to become viscous. The solubility of sulphur in liquified butadiene is very low, and the two materials should be constantly stirred or agitated to secure intimate intermixing. At reaction temperatures below the melting point (about 115° C.) of sulphur, special care must be taken to avoid lumping or agglomerating of finely divided sulphur and the attendant presence within the reaction mass of unreacted lumps or aggregates of sulphur. The presence in the reaction mixture of the aforementioned wetting agents promotes the intimate intermixing of the butadiene and sulphur. The exact nature of the reaction between the butadiene and sulphur is not known to us. The butadiene is polymerized and most of the sulphur, if not all, combines chemically with the butadiene. The product of the reaction is a homogeneous material resembling and possessing many of the characteristic properties of natural rubber.

We claim:

1. The method of making a rubber-like product which comprises heating a mixture of 1, 3 butadiene and sulphur in a closed vessel at a temperature of from 70° C. to 160° C. for from one hour to 100 hours, the relative proportions by weight of butadiene and sulphur in said mixture being from 1 part of butadiene and 1 part of sulphur to 1 part of butadiene and 9 parts of sulphur.

2. The method of making a rubber-like product which comprises introducing finely divided sulphur into a closed vessel, introducing liquid 1, 3 butadiene into said vessel in amount by weight of from 1 part of butadiene to from 1 to 9 parts of sulphur, and heating the resulting mixture in said vessel for from 1 to 100 hours at a temperature of 70–160° C.

3. The method of making a rubber-like product which comprises heating a mixture containing by weight 1 part of 1, 3 butadiene and from 1 to 9 parts of sulphur and from 0.5 to 4 parts of water in a closed vessel at a temperature of 70° C. to 160° C. until a relatively soft and resilient rubber-like product is obtained.

4. The method of making a rubber-like product which comprises heating a mixture containing by weight 1 part of 1, 3 butadiene and from 1 to 9 parts of sulphur and from 0.5 to 4 parts of water in a closed vessel at a temperature of from 70° C. to 100° C. to form a hard ebonite-like product is obtained.

5. The method of making a rubber-like product which comprises heating a mixture of liquified 1, 3 butadiene, sulphur and water in a closed vessel at a temperature of 70° C. to 160° C. until a rubber-like reaction product is formed, the amounts by weight of sulphur and water in the mixture being 50–90% and 10–40% respectively of the aggregate weight of the mixture and the remainder 1, 3 butadiene.

6. The method of making a rubber-like product which comprises heating a mixture of liquified 1, 3 butadiene, sulphur and an aqueous solution of an alkali-metal sulphide in a closed vessel at a temperature of 70–160° C. until a rubber-like reaction product is formed, the amounts by weight of sulphur and aqueous solution in the mixture being 50–90% and 10–40% respectively of the aggregate weight of the mixture and the remainder 1, 3 butadiene.

7. The method of making a rubber-like product which comprises heating a mixture of 1 to 9 parts by weight of sulphur and 1 part by weight of 1, 3 butadiene and containing from 0.5 to 4 parts of water and an alkali-metal sulphide in a closed vessel at a temperature of 70–160° C. until a rubber-like reaction product is formed.

8. The method of making a rubber-like product which comprises heating a mixture containing by weight from 1 to 2 parts of 1,3 butadiene and from 0.5 to 4 parts of an aqueous liquid and 4 parts of sulphur in a closed vessel at a temperature of 70° C. to 160° C. for from 1 to 100 hours and until a rubber-like product is obtained.

9. As a new article of manufacture, a rubber-like reaction product resulting from heating 1 part of 1, 3 butadiene with from 1 to 9 parts by weight of sulphur in a closed vessel at a temperature of 70° C. to 160° C.

10. As a new article of manufacture, a rubber-like reaction product resulting from heating 1 to 2 parts by weight of 1, 3 butadiene and 0.5 to 4 parts of water and 4 parts of sulphur in a closed vessel at a temperature of 70° C. to 160° C. for several hours.

RAYMOND F. BACON.
ROCCO FANELLI.